July 7, 1970 M. J. BASSO 3,519,519

TAPE WRAPPING MACHINE

Filed Oct. 23, 1965 3 Sheets-Sheet 2

INVENTOR.
Michael J. Basso
BY
Harness, Dickey & Pierce
ATTORNEYS.

TAPE WRAPPING MACHINE

Filed Oct. 23, 1965

INVENTOR.
Michael J. Basso
BY
Harness, Dickey & Pierce
ATTORNEYS.

July 7, 1970 M. J. BASSO 3,519,519

TAPE WRAPPING MACHINE

Filed Oct. 23, 1965 3 Sheets-Sheet 3

INVENTOR.
Michael J. Basso
BY
Harness, Dickey & Pierce
ATTORNEYS.

3,519,519
TAPE WRAPPING MACHINE
Michael J. Basso, 7642 Woodward Ave.,
Detroit, Mich. 48202
Filed Oct. 23, 1965, Ser. No. 503,815
Int. Cl. B65h *81/08;* H01b *13/08*
U.S. Cl. 156—430 13 Claims

ABSTRACT OF THE DISCLOSURE

A tape wrapping machine for making wire conductor harnesses and comprising means defining a support structure, an annular turntable defining a central opening, means rotatably supporting the turntable on the structure, a pair of nonrotatable jaw members disposed within the opening, means for selectively moving the jaw members to and from a position clampingly engaging a conductor to be wrapped with tape, means detachably engageable with a conductor for moving the same relative to the jaw members and the turntable, means including spindle means for supporting at least one roll of tape on the turntable at a position relative to the conductor whereby rotation of the turntable will result in the tape being unrolled and wrapped around the conductor, and means for simultaneously advancing the conductor relative to the turntable means and rotating the turntable means whereby the tape will be wrapped around the conductor in a generally helical configuration.

This invention relates generally to tape wrapping devices and, more particularly, to a new and improved apparatus for wrapping tape around two or more elongated wire conductors or similar type materials to provide wiring harnesses and the like.

The continuously increasing use of electrically powered accessories in automotive and other type vehicles, home appliances, machines and the like, together with the increasing use of virtually all types of electrically energized computing apparatus, has resulted in a need for a variety of different types of wiring harnesses comprising a multiplicity of substantially coextensive single or multiple wire conductors for use in a myriad of electrical current distributing and/or signal transmitting applications. By way of example, one typical use for a wiring harness comprising only a limited number of wire conductors is in the tail light-stop light circuit of an automobile. In this application, such a wiring harness would be used for communicating electrical current to a plurality of individual tail lights and/or stop lights from a conductor leading to the rear end of the vehicle from the electrical power producing system thereof, i.e., battery, generator, alternator, etc. A typical use for wiring harnesses comprising a relatively large number of wire conductors is in digital, analytical and various other types of electronic computing apparatuses. In such applications, different types of harnesses find use in communicating the various computer modes and/or internal computing sections.

It has heretofore been the practice in the manufacture of wiring harnesses of the above character to provide some type of means for adjacently orienting the desired number of wire conductors and after placing the conductors therein, to manually wind some type of tape, usually friction tape, around the conductors in a generally helical or spiral configuration. Such tape winding techniques have been the subject of objectionable criticism since they have been extremely time consuming by today's mass production standards and have resulted in inferior, non-uniform harnesses. For example, the wire conductors of the harnesses have been frequently loosely bound together and either too much or too little tape has been used during the wrapping operation.

The present invention is adapted to overcome the above objectionable features of heretofore known wire harness winding practices through the provision of a novel apparatus that includes a rotatable tape dispensing turntable having a central opening through which the conductors to be wound are simultaneously advanced. A conductor elevating or advancing assembly is provided above the turntable for moving the conductors through the opening therein, which assembly is provided with suitable means for varying the rate at which the conductors are moved relative to the turntable to selectively control the amount of tape used during each operational cycle, i.e., the amount of overlapping between successive convolutions of tape. Means are also provided on the turntable for dispensing one or more different kinds of tape such as friction tape or plastic tape, suitable roller means being provided where necessary to effect unrolling of the tape so that excessive lateral tension on the conductors is avoided during the winding operation. The turntable is also provided with a pair of expandable jaw members which are adapted to longitudinally tension the conductors as they are advanced relative to the turntable, thereby precluding the possibility of one or more of the conductors being relatively slack as the tape is wrapping therearound.

It is accordingly a general object of the present invention to provide a new and improved tape wrapping machine for use in assembling wiring harnesses and the like.

It is another object of the present invention to provide a new and improved tape wrapping machine of the above character which is adapted to wind tape around two or more adjacently oriented wire conductors or the like in a relatively uniform manner.

It is still another object of the present invention to provide a tape wrapping machine of the above character which is adapted to wrap various kinds of tape on a wiring harness.

It is still another object of the present invention to provide a new and improved tape wrapping machine of the above character in which the quantity of tape that is wrapped on the wiring harness may be varied.

It is yet another object of the present invention to provide a new and improved tape wrapping machine of the above character which is adapted to accommodate various numbers of wire conductors or the like.

It is still a further object of the present invention to provide a new and improved tape wrapping machine of the above character which is provided with means for unrolling adhesive type tapes such as friction tape from a roll so as to prevent lateral tension on the conductors as they are being wrapped with the tape.

It is still another object of the present invention to provide a new and improved tape wrapping machine of the above character which is provided with means for longitudinally tensioning the conductors as they are being wrapped with tape.

It is yet a further object of the present invention to provide a new and improved tape wrapping machine of the above character which is of a relatively simple design and is easy to assemble.

It is a further object of the present invention to provide a new and improved tape wrapping machine of the above character which is adapted to be constructed of readily available component parts and is therefore economical to commercially manufacture.

It is still another object of the present invention to provide a tape wrapping machine of the above character which is of an extremely durable construction and is reliable in operation.

Other objects and advantages of the present invention will become apparent from the following detailed description taken in conjunction with the accompanying drawings, wherein:

FIG. 6 is an elevated perspective view of a slightly modified embodiment of the tape wrapping apparatus of the present invention.

Figure 1:
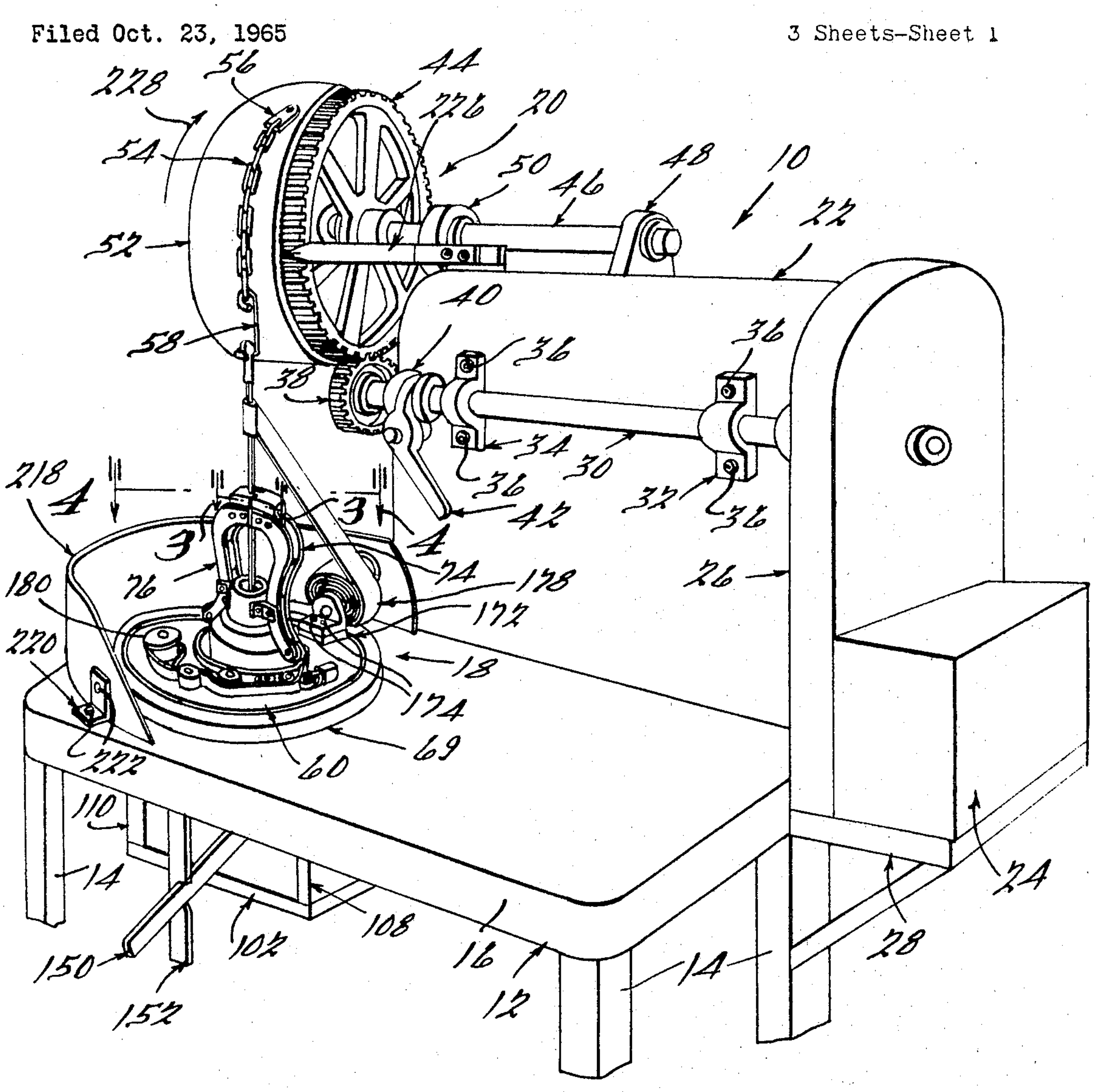
FIG. 1 is an elevated perspective view of a tape wrapping apparatus embodying the principles of the present invention.
Figure 3:
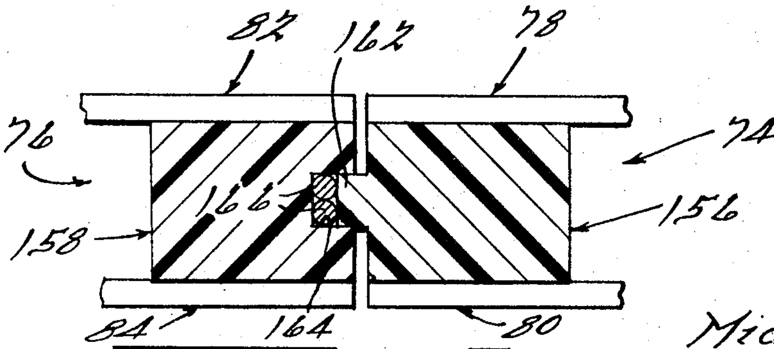

Referring now to FIG. 1 of the drawings, a tape wrapping machine 10, in accordance with an exemplary embodiment of the present invention, is shown as comprising a support structure 12 having a plurality of vertically extending legs 14 which support a horizontally extending platform 16. Generally speaking, the machine 10 comprises a tape winding assembly 18 which is mounted upon the platform 16, and a wire conductor advancing or elevating assembly 20 which is mounted upon an enclosure 22 located adjacent the rearward side of the platform 16 and extending upwardly therefrom. Power is provided for the operation of the machine 10 through a suitable electric motor or the like (not shown) that is disposed within a motor housing 24 and which, together with a gear housing 26, is mounted on a suitable support platform 28 located at the right end of the enclosure 22. The housing 26 comprises suitable gearing for transmitting rotary power from the aforesaid drive motor to a drive shaft 30 which is rotatably mounted on the forward or front side of the enclosure 22 by means of a pair of bearing assemblies 32 and 34 that are attached to the enclosure 22 by means of suitable screws, bolts or the like 36. Mounted on the left end of the drive shaft 30 is a pinion gear 38 which is movable axially of the shaft 30 by means of a suitable telescoping mechanism 40. The mechanism 40 includes a pivotably mounted handle or lever 42 which, when disposed in the position illustrated in FIG. 1, radially aligns the pinion gear 38 with the outer periphery of a gear 44 that controls operation of the conductor advancing assembly 20. The gear 44 is mounted on a rotatable shaft 46 which is in turn supported on the top of the enclosure 22 by means of a pair of suitable bearing assemblies 48 and 50. Mounted on the extreme outer end of the shaft 46 adjacent the left side of the gear 44 is cylindrical conductor winding drum 52 which is rotatable along with the shaft 46 and gear 44. The drum 52 is provided with a conductor elevating chain or the like 54 which is connected to the outer periphery of the drum by means of a suitable bracket 56, the chain 54 being provided with a suitable hook member 58 on the opposite end thereof adapted for engagement with a plurality of wire conductors to be wrapped by the machine 10, as will later be described.

It will be seen that when the pinion gear 38 and positioning lever 42 are disposed in the relative positions illustrated in FIG. 1, the gear 38 will be in peripheral engagement with the gear 44, whereby rotation of the drive shaft 30 will simultaneously rotate the gear 44 and hence the drum 52. At such time as the lever 42 is pivoted to the position indicated in FIG. 2, the pinion gear 38 will move toward the right out of peripheral engagement with the shaft 44 to enable the drum 52 to be manually rotatably adjusted, as will later be described.

Figures 2, 3:
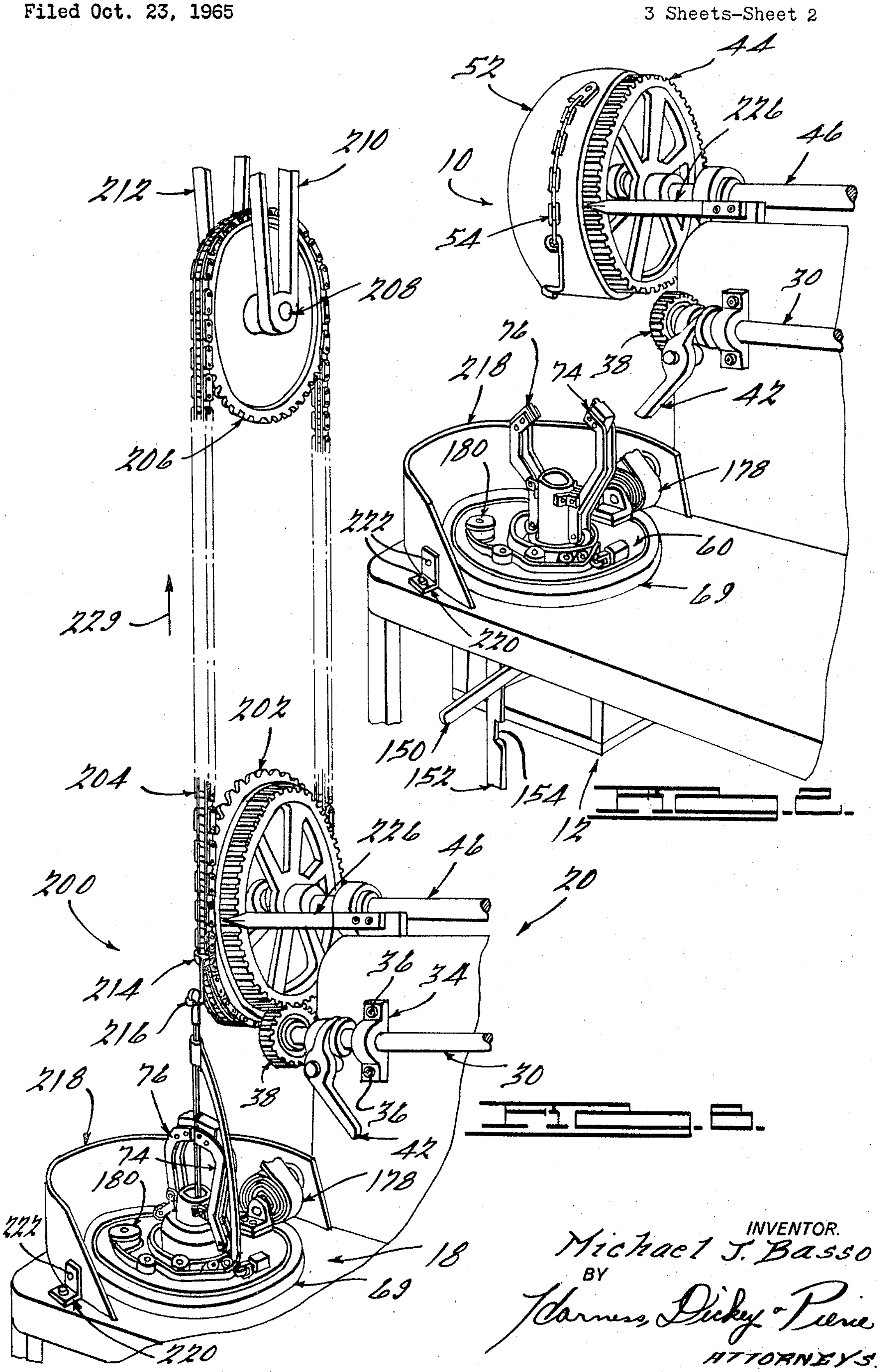
FIG. 2 is an elevated perspective view of a portion of the structure illustrated in FIG. 1 showing the conductor tensioning jaws in an open position.
FIG. 3 is an enlarged transverse cross-sectional view taken along the line 3—3 of FIG. 1.
Figure 4:
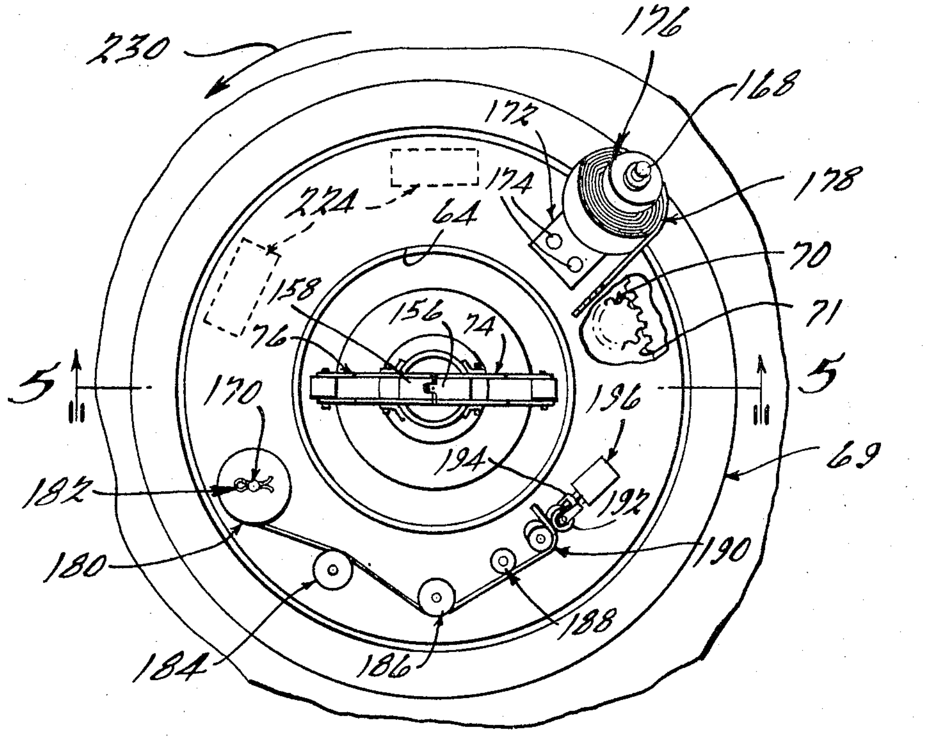
FIG. 4 is a fragmentary top elevational view, partially broken away, of a portion of the structure illustrated in FIG. 1, as taken substantially along the line 4—4 thereof.
Figure 5:
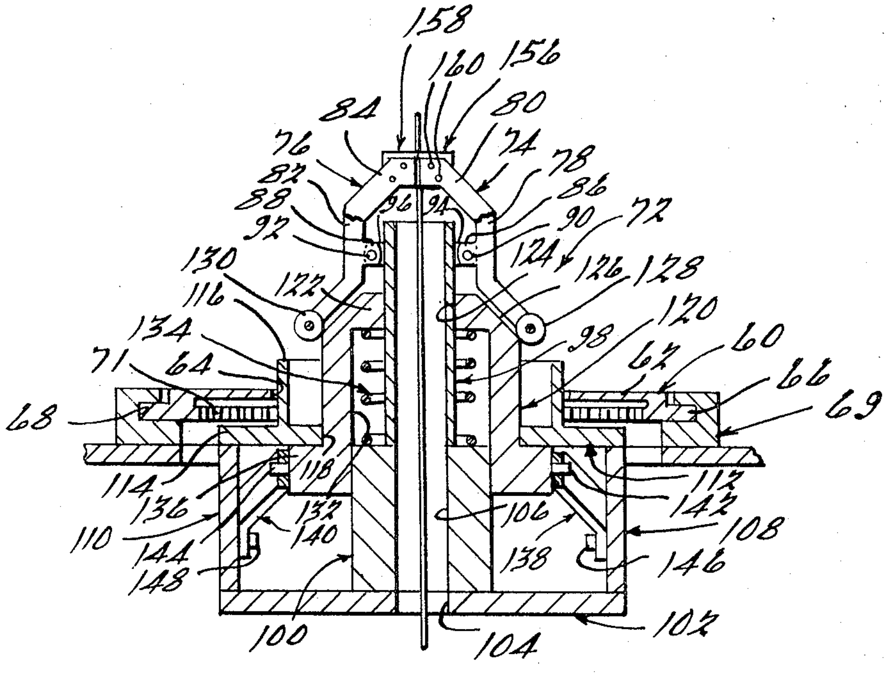
FIG. 5 is a transverse cross-sectional view of the structure illustrated in FIG. 4, as taken substantially along the line 5—5 thereof.

Referring now in detail to the construction of the tape-winding assembly 18, as seen in FIGS. 1, 2 and 5, the assembly 18 comprises an annular tape dispensing turntable 60 comprising a flat horizontally extending platform section 62 which defines a central annular opening 64. The turntable 60 is formed with a radially outwardly projecting flange section 66 which is received in an annular groove 68 that is formed in an annular support or retaining ring 69. The ring 69 is preferably constructed of a relatively hard wear-resistant material such as bronze or the like, and is rigidly secured to the top of the platform 16 by any suitable means. The turntable 60 is rotated by means of a pinion gear 70 which is driven through suitable rotatable means (not shown) by the aforementioned drive motor disposed within the housing 24. As seen in FIG. 4, the gear 70 is peripherally engageable with a plurality of circumferentially spaced, radially inwardly projecting gear teeth 71 formed on radially inner edge of the flange section 66. Disposed coaxially of the central opening 64 in the turntable 60 is a conductor tensioning assembly 72 that comprises a pair of generally S-shaped expandable jaw members 74 and 76 which, as illustrated in FIGS. 3 and 4, comprise identical jaw sections 78, 80 and 82, 84, respectively, that are spaced apart in the manner illustrated in FIG. 3. The jaw members 74 and 76 are formed with inwardly projecting flange sections 86 and 88, respectively, which are pivotably connected by means of suitable pivot pins 90 and 92 to a pair of axially aligned, diametrically opposed and radially outwardly extending shoulder portions 94 and 96 formed on a central jaw support tube 98 which extends coaxially of the turntable 60. As best seen in FIG. 5, the tube 98 is supported at its lower end by a hollow support member 100 which is in turn supported upon a horizontally extending plate 102 having an opening 104 that is aligned with a bore 106 in the member 100 and with the inner periphery of the tube 98. As best illustrated in FIG. 1, the plate 102 is supported subjacent the platform 16 by means of a pair of spaced vertically or upwardly extending side members 108 and 110.

Referring now to FIG. 5, the side members 108 and 110 are secured to the lower side of an annular guide member, generally designated 112, which comprises a base portion 114 that extends substantially parallel to the turntable 60 directly below the lower side thereof. The guide member 112 also comprises a vertically extending cylindrical portion 116 which is axially arranged within the opening 64 of the turntable 60, the outer periphery of the portion 116 being spaced somewhat radially inwardly from the inner periphery of the opening 64 to prevent any interference upon rotation of the turntable 60 relative to the member 112. The base portion 114 of the guide member 112 defines a central annular opening 118 that serves as a guide means for a hollow cylindrical jaw contracting member 120. The upper end of the member 120 is formed with a radially inwardly extending portion 122 which defines a central bore 124 that is adapted to receive or slidably engage the outer periphery of the support tube 98. The radially outer surface of the portion 122 defines a frusto-conical or tapered surface portion 126 which is engageable with the pair of roller assemblies 128 and 130 that are rotatably mounted on the lower ends of the jaw members 74 and 76, respectively. The lower end of the member 120 defines another annular bore 132 which is coaxially aligned with the bore 124 and is adapted to be slidably engageable with the outer periphery of the support member 100, as illustrated in FIG. 5. A helical coil spring 134 is interposed between the top or the support member 100 and the upper end of the bore 132 and functions to resiliently urge the contracting member 120 axially upwardly relative to the support member 100 and tube 98. The lower end of the member 12. is formed with a radially outwardly extending shoulder portion 136 which is adapted to bear against the lower side of the base portion 114 of the guide member 112 to limit upward movement of the member 120 relative to the tube 98.

A pair of pivot arms 138 and 140 are pivotably connected to the opposite sides of the expander member portion 136 by suitable screws, bolts, pivot pins or the like 142 and 144, respectively. The arms 138 and 140 are connected at their medial portions to the inboard surfaces of the side members 108 and 110 by means of suitable pivot pins or the like 146 and 148, the ends of the arms 138 and 140 opposite those which are pivotably connected to the member 120 being connected to an elongated handle 150 which, as illustrated in FIG. 1, extends forwardly from beneath the support structure 12 at a position to facilitate convenient gripping thereof by the operator of the tape wrapping machine 10. The handle 150 is adapted to be releasably maintained in the position illustrated in FIG. 1 by means of a retaining bracket or the like 152 which extends downwardly from beneath the lower side of the platform 16 and is formed with a notched portion 154 (see FIG. 2) that is adapted to receive the handle 150 therein for retaining it in said position. The handle 150, together with the arms 138, 140 and member 120, is adapted to effect expanding and contracting of the jaw members 74 and 76, as will hereinafter be described.

At such time as the handle member 150 is removed from the notch portion 154 of the bracket 152, the handle 150 may be moved upwardly, whereby the ends of the arms 138 and 140 pivotally connected to the member 120 will be pivoted downwardly about the axes of the pins 146 and 148. As the arms 138 and 140 are thus moved, the member 120 will move downwardly relative to the support tube 98 and support member 100, as illustrated in FIG. 2. The jaw members 74, 76 are provided with spring means (not shown) which, when the member 120 is moved downward, forces the upper ends of the jaw members 74 and 76 to move radially outwardly to the open or expanded position indicated in FIG. 2. When the jaws 74 and 76 are thus opened, the plurality of conductors which are to be wrapped by the machine 10 for forming a wire harness may be inserted between the upper ends thereof, as will later be described. After such time as the conductors have been properly positioned, the handle 150 is moved downwardly from the position indicated in FIG. 2 to the position indicated in FIG. 1, where the handle 150 may be again retained within the notched portion 154 of the bracket 152. As the handle 152 is thus moved, the arms 138 and 140 move upwardly relative to the members 98 and 100, thereby moving the contracting member 120 upwardly, resulting in the roller assemblies 128 and 130 on the lower ends of the jaw members 74 and 76 moving downwardly and radially outwardly over the frustoconical surface 126 defined at the upper end of the member 120, thereby forcing the lower ends of the jaw members 74 and 76 apart and hence the upper ends thereof toward one another to clampingly engage the conductors therebetween. It will be noted that the spring 134 continuously applies an upwardly directed force upon the member 120 to assure that the conductors are compressed between the upper ends of the jaw members 74 and 76.

As best seen in FIG. 3, interposed between the upper ends of the jaw sections 78, 80 and 82, 84 and the jaw members 74 and 76 is a pair of interengageable conductor tensioning clamping members 156 and 158, respectively, which members are secured to the upper ends of the sections 78, 80, 82 and 84 by means of suitable screws, bolts or the like 160, as best seen in FIG. 5. The member 156 is formed with a generally rectangular shaped outwardly projecting section 162 that is adapted to be received within a complementary shaped recessed portion 164 formed in the adjacent side of the member 158. The members 156, 158 are preferably constructed of Delrin, a low coefficient of friction, wear-resistant, synthetic plastic material that may be easily fabricated as by molding. It will be seen that the portions 162 and 164 are adapted to compressingly engage a plurality of conductors which are being wrapped with tape by the machine 10, a pair of which conductors are shown in FIG. 3 and designated by the numeral 166. The spring member 134 is adapted to apply sufficient upwardly directed force to the member 120 so that the upper ends of the jaw members 74 and 76 are forced together in a manner such that an appreciable amount of pressure is applied to the conductors 166 for tensioning the same during the tape wrapping operation, as will later be described.

Referring now to FIG. 4, mounted on the upper side of the turntable section 62 is a pair of spindles 168 and 170 which are adapted to support rolls of tape used in wrapping the conductors 166 and the like, during the forming of a wiring harness. More particularly, the spindle 168 is supported by a mounting bracket 172 which is secured to the upper side of the turntable section 62 by means of suitable screws, bolts or the like 174 (see FIG. 1). The spindle 168 is preferably mounted at an angle such that as the tape is unrolled tangentially therefrom along a substantially straight line, this line intersects the vertical axis of the support ube 98 substantially midway between the drum 52 and the upper ends of the jaw members 74 and 76, as illustrated in FIG. 1. The spindle 168 is adapted to support a roll of substantially nonadhesive type tape, for example, plastic electrician's tape, which may be unrolled without any appreciable force being applied to the taperoll. The upper end of the spindle 168 may be provided with suitable detchably engageable means such as threads or the like for accommodating a retainer cap 176 that is removably secured to the upper end of the spindle 168 and functions to retain a roll of tape 178 thereon during operation of the machine 10.

The spindle 170 which, is illustrated in FIG. 4, is disposed substantially diametrically opposite the spindle 168, is adapted to support tape which is substantially more adhesive in character than the tape supported on the spindle 168, for example, friction tape or the like, a roll of which is shown in FIG. 4 and designated by the numeral 180. Means in the form of a retaining clip or the like 182 is detachably secured to the upper end of the spindle 170 for securing the roll of tape 180 thereon. Due to the fact that an appreciable amount of force is required to unroll the tape from the roll 180, a plurality of rollers 184, 186, 188 and 190 are rotatably secured to the upper side of the turntable 60 in the configuration best illustrated in FIG. 4. The rollers 184, 186, 188 and 190 are arranged such that the tape will be unrolled with a minimum of effort so that there will very little lateral force applied to the conductors as they are being wrapped with the tape. Another roller 192 is supported upon a suitable clevis member 194 and is adapted to maintain the tape in peripheral engagement with the roller 190 as it is fed on to the conductors. A suitable spring mechanism 196 is provided to resiliently urge the roller 192 into engagement with the tape, the rollers 190 and 192 being mounted such that their axes are somewhat inclined so that the tape being fed therebetween will be applied to the conductors in substantially the same manner as the tape which is being unrolled from the tape roll 178, i.e., the tape will intersect the conductors at a position substantially midway between the drum 52 and the upper ends of the jaw members 74, 76.

Referring now to FIG. 6 of the drawings, a tape wrapping machine 200, in accordance with a slightly modified construction of the present invention, is shown as comprising a tape winding assembly 18 and a wire conductor advancing or elevating assembly 20, both of which assemblies are identical in construction and operation to the assemblies designated by like numerals in FIG. 1, with the exception that in the assembly 20, the drum 52 is replaced with a geared sprocket member 202 which is adapted to be rotatably mounted upon the shaft 46 along with the gear 44 in a manner identical to the way the drum 52 is rotatably mounted in FIG. 1. The geared sprocket member 202 is connected through a conventional drive chain 204 to an elevated gear pulley member 206 which is rotatably mounted upon an elevated horizontally extending axis or shaft 208 that extends between and is supported by a pair of overhead support members 210 and 212. The chain 204 is adapted to function in elevating or advancing conductors relative to the assembly 18 in a manner substantially identical to the drum 52, with the difference that the chain 204 advances the conductors along a generally vertical line instead of rotating them around the periphery of the drum 52. A conductor-engaging bracket 214 having a lower hook shaped section 216 is connected to the chain 204 and is adapted to releasably engage the upper ends of the conductors for advancing the same through the assembly 18, in a manner to be hereinafter described.

As best seen in FIGS. 2 and 6, the tape wrapping machines 10 and 200 of the present invention, may be provided with generally semicircular shaped shield members 218, which are secured to the upper surfaces of the platforms 16 circumjacent the turntables 60, the shield members 218 being secured to the platforms 16 by means of suitable L-shaped fastening members 220 and suitable screws, bolts or the like 222. As seen in FIG. 4, the turntable 60 may be provided with suitable counterweights indicated in dotted lines and generally designated by the numeral 224 which serves to minimize any turntable vibrations during rotation thereof.

To facilitate correlating the various component members of the tape wrapping machine 10 embodying the principles of the present invention, a brief exemplary operational cycle thereof will now be given, with the various operational distinctions between the machines 10 and 200 being explained.

Initially, the handle member 150 is moved to the position indicated in FIG. 2, thereby opening or expanding the jaw members 74 and 76, as hereinabove described. Thereafter, the lever 42 is pivoted to the position indicated in FIG. 2 wherein the pinion gear 38 is biased out of peripheral engagement with the gear 44 to permit the drum 52 or, in the case of the machine 200, the chain 204, to be rotated a predetermined amount. A pointer member 226 may be provided on the top of the enclosure 22, the forward end of which preferably extends in front of the forward side of the gear 44. The gear 44 may be provided with suitable reference mark or indicia which may be aligned with the end of the pointer member 226 upon appropriate rotation of the gear 44, the reference mark being placed on the gear 44 at a position wherein the conductor engaging hook members 58 or 214 are disposed at a predetermined height above the jaw members 74 and 76 preparatory to the operational cycle of the machines 10 and 200. After the drum 52 or chain 204 has been properly positioned, the lever 42 is biased to the position shown in FIG. 1 to reengage the pinion gear 38 with the gear 44. When this has been done, the particular number of conductors which are to be wrapped during operation of the machines are inserted through the support tube 98 and bore 106 of the support member 100, the upper ends of the conductors, for example, the conductors 166 in FIG. 3, are then secured to the hook members 58 or 214. After the conductors have been thus secured, the handle 150 may be biased downwardly and positioned within the notched portion 154 of the bracket 152, thereby causing the member 120 to move upwardly to force the upper ends of the jaw members 74 and 76 toward one another to compress the conductors 166 between the portions 162 and 164 of the clamping members 156 and 158, as above described.

Depending upon the type of tape which is to be wrapped around the conductors in forming the wiring harness, the end of the particular roll, either the roll on the spindle 168 or 170, is wrapped around or similarly secured to the conductors at a position approximately midway between the upper ends of the jaw members 74 and 76 and the lower end of the drum 52 or sprocket 202. If plastic tape is used, the end of the tape is best secured to the conductors by tying the tape thereto; however, when friction tape is used, the adhesive characteristics of the tape are such that the tape can be secured to the conductors merely by wrapping the end of the tape therearound. After the tape has been thus secured to the conductors, the drive motor located within the motor housing 24 may be energized, at which time the drive shaft 30 will rotate the pinion gear 38, resulting in the drum 52 rotating in the direction of the arrow 228 in FIG. 1 or the chain 204 moving in the direction of the arrow 229 in FIG. 6. As the gear 44 rotates, the conductors will be advanced upwardly relative to the jaw members 74, 76. Simultaneously, with rotation of the drum 52, the pinion gear 70 will rotate the turntable 60 in the direction of the arrow 230 in FIG. 4, whereby the particular type of tape being used will unroll and be wound or wrapped around the periphery of the conductors which are moving upwardly relative to the turntable 60. The speeds at which the gear 44 and turntable 60 revolve are selected such that the tape will be wound or wrapped around the outer periphery of the conductors in a generally helical configuration with a predetermined amount of overlapping between each successive convolution or spiral of tape on the conductors. The drive motor will remain energized until such time as the gear 44 rotates to a position such that a second reference mark or indicia thereon registers with the pointer 226, at which time the operator will deenergize the drive motor. The second reference mark is located on the gear 44 at a position corresponding to the lower end of the tap-wrapped portion of the conductors. The tape may then be cut and the lower end thereof wrapped or tied around the conductors in any suitable manner. The handle 152 may be thereafter moved to the position indicated in FIG. 2, expanding the jaw members 74 and 76 or, alternatively, the drive motor may be reenergized to rotate the gear 44 a predetermined amount to pull the lower ends of the conductors upwardly until they are free of the jaw members 74 and 76. The upper end of the conductors may be then released from the hook members 58 or 216 to provide a completed wiring harness. After the wiring harness has been removed from the machine, the pinion gear 38 is disengaged from the gear 44 and the jaws 74 and 76 are opened preparatory to the next operational cycle of the machines 10, 200, as hereinabove described.

A particular feature of the tape wrapping machine of the present invention resides in the fact that the gearing between the drive motor and the turntable 60 and drum 52 (or chain 204) may be varied to change the degree of overlapping of the tape as it is wrapped around the conductors, thereby accommodating different types of wiring harness comprising varying numbers of wire conductors or the like. Another feature of the present invention will be seen from the fact that while the conductors are being wrapped, they are continuously longitudinally tensioned to prevent any slack from occurring in one or more of the conductors, thereby providing easy to handle and neat appearing wiring harnesses. Still another feature of the present invention will be seen from the fact that the tape wrapping machine of the present invention is constructed of readily available parts and is therefore economical to commercially manufacture.

While it will be apparent that the exemplary embodiments herein illustrated are well calculated to fulfill the objects above stated, it will be appreciated that the invention is susceptible to modification, variation and change without departing from the proper scope or fair meaning of the subjoined claims.

What is claimed is:

1. In an apparatus for winding a strip of material around a relatively small cross-sectioned elongated workpiece, turntable means for rotatably supporting the strip of material,
means for advancing the workpiece along a predetermined path adjacent said turntable means,
means for resisting movement of the workpiece by said last mentioned means,
said means for resisting workpiece movement comprising a pair of cooperable pivotable jaw members disposed substantially along the axis of rotation of said turntable and pivotable relative to one another between open and closed positions,
said jaw members when pivoted to said open position permitting insertion of the workpiece therebetween, and when pivoted to said closed position engaging the workpiece and yieldingly resisting movement thereof so as to tension the workpiece as the strip material is wound thereon,
said jaw members being engageable with the workpiece at a position between said turntable and the location where the strip material is applied to the workpiece,
means for selectively pivoting said jaw members between said open and closed positions, and
drive means for actuating said turntable means and said workpiece advancing means whereby the workpiece will be simultaneously advanced along the path and the strip of material will be rotated around the workpiece resulting in the material being wrapped around the workpiece in a general helical configuration.

2. The invention as set forth in claim 1 wherein said workpiece advancing means moves the workpiece coaxially of said turntable means.

3. The invention as set forth in claim 1 wherein said workpiece advancing means comprises drum means for rolling the workpiece thereon to advance the same relative to said turntable means.

4. In a tape wrapping machine for making wire conductor workpieces and the like,
means defining a support structure,
turntable means rotatably mounted on said structure,
means for supporting a workpiece centrally of said turntable means and resisting movement of the workpiece,
said means for resisting workpiece movement comprising a pair of cooperable pivotable jaw members disposed substantially along the axis of rotation of said turntable and pivotable relative to one another between open and closed positions,
said jaw members when pivoted to said open position permitting insertion of the workpiece therebetween, and when pivoted to said closed position engaging the workpiece and yieldingly resisting movement thereof so as to tension the workpiece as the strip material is wound thereon,
said last mentioned means being engageable with the workpiece at a position between said turntable and the location where the strip material is applied to the workpiece,
means for selectively pivoting the said jaw members between said open and closed positions,
means on said turntable means for rotatably supporting a roll of tape, and
drive means for simultaneously rotating said turntable means and advancing the conductor relative to said turntable means, whereby the tape will be wrapped around the conductor in a generally helical configuration,
said means for supporting the conductor centrally of said turntable means resisting movement of the conductor relative to said turntable means to tension the conductor as the tape is wrapped therearound.

5. The invention as set forth in claim 4 wherein said means for supporting the conductor centrally of said turntable means comprises a pair of expandable jaw members non-rotatably mounted on said support structure.

6. The invention as set forth in claim 4 which includes rotatable drum means for advancing the conductor relative to said turntable means, the periphery of said drum means being located substantially along the axis of rotation of said turntable means.

7. In a tape wrapping machine for making wire conductor workpieces and the like,
means defining a support structure,
an annular turntable defining a central opening,
means rotatably supporting said turntable on said structure,
a pair of cooperable pivotable jaw members disposed substantially along the axis of rotation of said turntable and pivotable relative to one another between open and closed positions,
said jaw members when pivoted to said open position permitting insertion of the workpiece therebetween, and when pivoted to said closed position engaging the workpiece and yieldingly resisting movement thereof so as to tension the workpiece as the strip material is wound thereon,
said last mentioned means being engageable with the workpiece at a position between said turntable and the location where the strip material is applied to the workpiece,
means for selectively pivoting said jaw members between said open ond closed positions,
means detachably engageable with a conductor for moving the same relative to said jaw members and said turntable,
means including spindle means for supporting at least one roll of tape on said turntable at a position relative to the conductor whereby rotation of said turntable will result in the tape being unrolled and wrapped around the conductor, and
means for simultaneously advancing the conductor relative to said turntable means and rotating said turntable means whereby the tape will be wrapped around the conductor in a generally helical configuration.

8. The invention as set forth in claim 7 wherein said means for advancing the conductor comprises a rotatably mounted drum and means on the periphery of said drum for detachably securing the conductor thereto, whereby rotation of the drum will cause the conductor to be advanced relative to said turntable.

9. In a tape wrapping machine for making wire conductor harnesses and the like,
means defining a support structure,
an annular turntable defining a central opening,
means rotatably supporting said turntable on said structure,
a pair of nonrotatable jaw means disposed within said opening,
said last mentioned means being engageable with the workpiece at a position between said turntable and the location where the strip material is applied to the workpiece,
means for selectively moving said jaw means between engaging and disengaging relation with the workpiece,
handle means and link means interconnecting said handle means and said jaw means, whereby pivotal movement of said handle means will bias said jaw means to and from said position clampingly engaging a conductor,
means detachably engageable with a conductor for moving the same relative to said jaw means and said turntable,
means including spindle means for supporting at least one roll of tape on said turntable at a position relative to the conductor whereby rotation of said turntable will result in the tape being unrolled and wrapped around the conductor, and means for simultaneously advancing the conductor relative to said turntable means and rotating said turntable means whereby the tape will be wrapped around the conductor in a generally helical configuration.

10. In a tape wrapping machine for making wire conductor harnesses and the like, means defining a support structure, an annular turntable defining a central opening, retaining ring means for rotatably supporting said turntable on said support structure, a support tube extending coaxially of said turntable, a pair of jaw members pivotably secured to the opposite sides of said support tube, jaw means secured to the upper ends of said jaw members for clampingly engaging a conductor to be wrapped with tape, roller means mounted on the opposite ends of said jaw members, means slidably mounted on said support tube and engageable with said roller means for moving said jaw members to and from a position clampingly engaging the conductor, spring means normally urging said last mentioned means toward the upper end of said support tube, handle means on said support structure, means interconnecting said handle means and the said last mentioned means, whereby movement of said handle means in one direction biases the said means axially of said support tube to move said jaw members into clamping engagement with the conductor, spindle means mounted on one side of said turntable for supporting at least one roll of tape thereon, means for advancing the conductor relative to said turntable and said jaw members, said conductor advancing means comprising first gear member rotatably mounted on said structure and a second gear member movable to and from a position peripherally engaging said first gear member, means connected to said first gear member detachably engageable with the conductor, whereby rotation of said gear members will advance the conductor relative to said turntable, and drive means for simultaneously rotating said gear means and said turntable means, whereby the conductor will be advanced relative to said turntable and said turntable will be rotated around the conductor in a manner such that the tape mounted on said turntable will be wrapped around the conductor in a generally helical configuration.

11. The invention as set forth in claim 10 which includes a cylindrical drum secured to said first gear means and rotatable therewith for advancing a conductor axially of said turntable.

12. The invention as set forth in claim 10 which includes a drive chain rotatable with said first gear means for advancing a conductor axially of said turntable.

13. The invention as set forth in claim 10 wherein said jaw means secured to the upper ends of said jaw members are constructed of a low coefficient of friction, slightly deformable, synthetic plastic material.

References Cited

UNITED STATES PATENTS

| | | | |
|---|---|---|---|
| Re. 20,146 | 10/1936 | McCahey | 87—61 XR |
| 1,961,833 | 6/1934 | Staples | 117—20 |
| 2,006,826 | 7/1935 | Elliot | 96—3 |
| 3,058,867 | 10/1962 | Plummer et al. | 156—52 |
| 3,077,068 | 2/1963 | Miller | 57—15 |
| 3,230,123 | 1/1966 | Christensen | 156—195 |

FOREIGN PATENTS

| | | |
|---|---|---|
| 27,743 | 10/1909 | Great Britain. |
| 1,197,656 | 12/1959 | France. |

JOHN T. GOOLKASIAN, Primary Examiner

D. J. FRITSCH, Assistant Examiner

U.S. Cl. X.R.

156—459, 494, 53, 428, 431, 432